(12) United States Patent
Gottsman

(10) Patent No.: US 7,739,085 B2
(45) Date of Patent: Jun. 15, 2010

(54) MONTE CARLO SIMULATION AND DISPLAY OF RESULTS THEREOF

(75) Inventor: Edward J. Gottsman, Evanston, IL (US)

(73) Assignee: Accenture Global Services GmbH, Schaffhausen (CH)

( * ) Notice: Subject to any disclaimer, the term of this patent is extended or adjusted under 35 U.S.C. 154(b) by 974 days.

(21) Appl. No.: 11/464,709

(22) Filed: Aug. 15, 2006

(65) Prior Publication Data
US 2008/0126024 A1  May 29, 2008

(51) Int. Cl.
G06G 7/48 (2006.01)
(52) U.S. Cl. .......................................................... 703/6
(58) Field of Classification Search ....................... 703/6
See application file for complete search history.

(56) References Cited

U.S. PATENT DOCUMENTS

| | | | |
|---|---|---|---|
| 7,054,878 B2 * | 5/2006 | Gottsman et al. | 707/101 |
| 2006/0059439 A1 * | 3/2006 | Hao et al. | 715/805 |
| 2006/0179032 A1 | 8/2006 | Gottsman | |

OTHER PUBLICATIONS

Microsoft corporation, "User's Guide Microsoft Excel", version 5.0, 1994, Microsoft Corporation, p. 593.*
Keith Smillie, "Rolling Dice: Some Notes on J and Teaching Probability", 1993, ACM SIGAPL APL Quote Quad, vol. 24, issue 1, pp. 238-243.*
Donald H. Sanders et al., "Statistics a Fresh Approach", second edition, 1980, McGraw-Hill Book Company, pp. 240-241.*
Rudolf J. Freund et al., "Statistical Methods", 1993, Academic Press, p. 570.*
William Mendenhall et al., "Introduction to probability and statistics", ninth edition, 1994, Duxbury Press, pp. 587, 621.*

Clint Steele, "The Prediction and Management of the Variability of Manufacturing Operations", Dec. 2005, Swinburne University of Technology.*
Gerald Steiner et al., "Managing uncertainties in electromagnetic design problems with robust optimization", Mar. 2004, IEEE Transactions on Magnetics, vol. 40, No. 2, pp. 1094-1099.*
"Monte Carlo simulation using Excel(R) Spreadsheet for Predicting Reliability of a Complex System", Gedam, S.G., et al., Reliability and Maintainability Symposium, 2000. Annual, Los Angeles CA Jan. 24-27, 2000, Piscataway, NJ USA, IEEE, US Jan. 24, 2000.
"Starting Simple—Adding Value to Static Visualisation Through Simple Interaction", Dix, Alan & Ellis, Geoffrey [Online] 1998, ACM Press, New York NY XP002456666; Retrieved from the Internet URL: http://doi.acm.org/10.1145/948496.9485 14>.
"Modelling and Simulation of a Telephone Call Center", Pichitlamken J., et al, Institute of Electrical and Electronics Engineers; Proceedings of the 200e Winter Simulation Conference, WSC '03, New Orleans, LA, Dec. 7-10, 2003, Winter Simulation Conference, New york, NY: IEEE, US vol. 2 of 2, Conf. 36, Dec. 7, 2003.
"International Search Report" for PCT/EP2007/007192, filed Aug. 15, 2007.

* cited by examiner

*Primary Examiner*—Paul L Rodriguez
*Assistant Examiner*—Russ Guill
(74) *Attorney, Agent, or Firm*—Vedder Price PC (57) ABSTRACT

A Monte Carlo simulation is performed based on a simulation model comprising a plurality of input variables and at least one output variable. The Monte Carlo simulation generates a large number of scenarios, each comprising random input values and resulting output values for the input and output variables. The input and output values for each scenario are stored in a suitable storage component. A plurality of icons, uniquely corresponding to and representative of at least a portion of the scenarios, are displayed in accordance with a displayed output variable. At least one of the displayed icons is selectable causing the underlying input and output values to be displayed. The icons may be displayed in a histogram form comprising a plurality of columns and, preferably, within each column, the corresponding icons may be sorted according to similarity of the input values for each icon to a plurality of target input values.

16 Claims, 7 Drawing Sheets

NAME: CSR $ / Hour

MIN: 10 — 504

TARGET: 15 — 506

MAX: 20 — 508

DECIMALS: 2 — 510

NAME: Cost per call

MIN: .10 — 604

TARGET: 0.6 — 606

MAX: 1.00 — 608

DECIMALS: 2 — 610

MONTE CARLO SIMULATION AND DISPLAY OF RESULTS THEREOF

FIELD OF THE INVENTION

The present invention relates generally to simulation techniques and, in particular, to a method and apparatus for improving such simulations and a user's ability to interact with simulation results.

BACKGROUND OF THE INVENTION

Computer-based modeling or simulation is well known in the art. Such simulations begin with the development of a model of a system that one wishes to test. Most often, the model comprises mathematical equations describing relationships between one or more input (independent) variables and one or more output (dependent) variables. By selecting specific values for the input variables, corresponding output values may be calculated for the output variables. In this manner, one can determine how the system, to the extent that it is accurately represented by the model, will respond to various situations represented by the input values. Note that, as used herein, a "system" may comprise virtually anything that can be represented by an appropriately constructed mathematical model, e.g., business processes, chemical reactions, financial transactions, etc.

One particularly powerful technique for use with simulations is the so-called Monte Carlo analysis technique. In Monte Carlo simulations, a range of plausible input values is designated for each input variable. Likewise, a distribution for each input variable (i.e., a probability distribution function) is also designated. Thereafter, the Monte Carlo simulation generates random inputs for each input variable based on the designated range of values and distributions for the corresponding variables. The random input values are then used to calculate corresponding output values that are thereafter saved, whereas the input values are thrown away. This process is repeated many times, typically numbering in the hundreds or thousands of repetitions, and is used to create statistically meaningful distributions of one or more of the output variables. In this manner, the analyst performing the Monte Carlo simulation (typically the designer of the simulation model) can develop insight into how the model will perform under certain sets of assumed input conditions.

While Monte Carlo simulation techniques are very valuable, beneficial use of the such techniques typically requires intimate knowledge of the underlying simulation model. Furthermore, to the extent that the output distributions are an aggregate of the multitude of tested scenarios, current Monte Carlo simulation tools provided only a limited opportunity to interact with, and therefore develop a true understanding of, the simulation model. Therefore, it would be advantageous to provide a technique for an improved simulation tool based on Monte Carlo analysis that additionally allows a user of the simulation tool to interact with the simulation model results in a relatively simple and intuitive manner.

SUMMARY OF THE INVENTION

The present invention provides an improved simulation tool and method for displaying results of a Monte Carlo simulation. In particular, a Monte Carlo simulation is performed based on a simulation model comprising a plurality of input variables and at least one output variable. The Monte Carlo simulation generates a large number of scenarios, each comprising random input values for the plurality of input variables used to calculate output values for the at least one output variable. Unlike prior art techniques, where only the output values for each scenario were preserved, the input and output values for each scenario are stored in a suitable storage component. Thereafter, a plurality of icons, uniquely corresponding to and representative of at least a portion of the scenarios, are displayed in accordance with a displayed (selected) output variable. At least one, and preferably each, of the displayed plurality of icons is selectable causing the underlying input and output values (i.e., the specific, corresponding scenario) to be displayed and thereby allowing the user of the simulation to develop greater insight into behavior of the simulation model. In a presently preferred embodiment, the plurality of icons are displayed in a histogram form comprising a plurality of columns corresponding to histogram bins. Furthermore, within each column, the corresponding portion of the plurality of icons are sorted within the column according to similarity of the input values for each icon to a plurality of target or nominal input values. In this manner, the present invention provides a particularly powerful technique for identifying scenarios in which otherwise in-range input values lead to out-of-range output values. Results of this type are particularly useful to identify in that they indicate the likelihood of a poorly designed simulation model or inaccurate assumptions concerning the model, the designated input variable ranges, the input variable distributions or combinations thereof.

BRIEF DESCRIPTION OF THE DRAWINGS

The features of the present invention are set forth with particularity in the appended claims. The present invention itself, together with further features and attendant advantages, will become apparent from consideration of the following detailed description, taken in conjunction with the accompanying drawings. One or more embodiments of the invention are now described, by way of example only, with reference to the accompanying drawings in which:

FIGS. 7 through 10 are exemplary display screens illustrating histogram display regions and variable display regions in accordance with the present invention.

DETAILED DESCRIPTION OF THE PRESENT EMBODIMENTS

Figure 1:
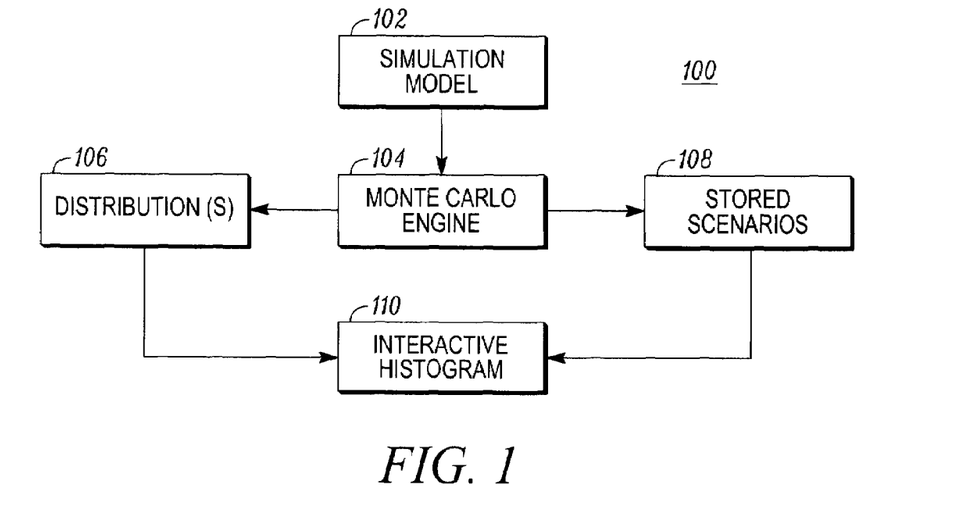
FIG. 1 is a block diagram of a simulation tool in accordance with the present invention.

Referring now to FIG. 1, a simulation tool in accordance with the present invention is schematically illustrated. In particular, the simulation tool 100 comprises a simulation model 102 that is exercised by a Monte Carlo engine 104 resulting in a plurality of stored scenarios 108. As used herein, a scenario comprises a given set of input values and the resulting set of output values. Additionally, the Monte Carlo engine 104 provides a plurality of distributions 106 that, as known in the art, constitute distributions of the one or more output variables corresponding to the stored scenarios 108 produced by the Monte Carlo engine 104. An interactive histogram 110 is provided in communication with the stored scenarios 108 and distributions 106. As described in greater detail below, the interactive histogram 110 allows a user of the simulation tool to develop deeper understanding of the various scenarios leading to the output variable distributions and, therefore, a deeper understanding of the performance of the underlying simulation model 102.

Generally, the simulation model 102 comprises one or more mathematically defined relationships used to abstractly represent a system of interest. For instance, in an example described in further detail with regard to FIGS. 5 through 10, a system such as a call center operation can be modeled as a series of relatively simple equations describing performance of key operational parameters. Furthermore, the simulation model 102 comprises specific probability distributions for each of the input variables as well as designated value ranges and, preferably, a target or nominal input value for each input variable. In a presently preferred embodiment, simulation models are implemented as a spreadsheet (e.g, using the Microsoft® Excel® spreadsheet program) having implemented therein the plurality of equations constituting the simulation model. Techniques for using spreadsheets in this manner are well known in the art.

The Monte Carlo engine 104, which is preferably implemented as a set of stored, processor-executable instructions (possibly combined with a spreadsheet program), generates random values for each input variable described by the simulation model 102 using known techniques. For example, a first input variable may have a corresponding Gaussian distribution, whereas a second input variable may have a corresponding Laplacian distribution. As known to those having ordinary skill in the art, any of a large number of probability distributions may be incorporated into the present invention. Furthermore, each input variable has associated therewith a designated range of values (defined by minimum and maximum values) and, preferably, a target or nominal input value. The Monte Carlo engine 104 generates random input values based on the range of values and corresponding probability distribution functions for each input variable. In a presently preferred embodiment, a range of desired output values including, optionally, a targeted output value, can also be designated for each output variable. Each set of randomly determined input variables and corresponding output values generated by the Monte Carlo engine 104 constitute a scenario in the context of the present invention. By generating a large number of scenarios (typically on the order of hundreds or thousands), Monte Carlo analysis allows a system designer to gain an understanding of behavior of the system under a wide variety of input circumstances.

In accordance with prior art techniques, the Monte Carlo engine 104 determines a plurality of distributions 106 for each output variable defined by the simulation model 102. This is typically done in histogram form whereby the entire range of output values is divided into a plurality of histogram bins and a corresponding tally of the number of output values within each histogram bin is determined. In one aspect of the present invention, each scenario generated by the Monte Carlo engine 104 is saved as a stored scenario 108 for later recall. This is in contrast to prior art techniques in which only the output values of each scenario were stored. In particular, and as described in further detail below, the stored scenarios 108 are used to populate an interactive histogram 110 with a plurality of icons, each icon being representative of a corresponding one of the stored scenarios 108.

The interactive histogram 110 comprises one or more interactive, visual displays that present at least a portion of the stored scenarios 108 in a manner that allows a user of the simulation tool 100 to interact directly with specific scenarios. In a current embodiment, the interactive histogram 110 is implemented in a Macromedia Flash development environment, frequently used for World Wide Web (WWW) applications. In particular, a so-called Flash "Clip" is used to define each input (independent) variable as a separate cell in a spreadsheet, each Clip allowing user entry of minimum, maximum and (preferably) target values for the corresponding input variable. In this embodiment, and for ease of implementation, the minimum, maximum and target values for each input variable are used to define a so-called triangular distribution for that input variable. However, as noted previously, any of a number of probability distribution functions could be equally used with the present invention, including different distributions for different input variables. Output (dependent) variables are likewise implemented using Clips that allow range and target value entry (of course, without the need for a corresponding distribution function), and are defined by separate spreadsheet cells implementing the equations of the simulation model. The Monte Carlo engine 104, which preferably operates under the control of an executive program controller, uses the value range defined by the minimum and maximum values and the probability distribution functions for each input variable to generate random input values during a single scenario run. That is, each input variable cell generates a random input value for itself, which values are then used by the output variable cells to calculate the corresponding output values for that run. Thereafter, all cell values (randomly-generated inputs and calculated outputs) are saved under the control of the executive. This process is repeated many times until a desired number of scenarios have been saved. After all scenario runs have been performed and the resulting scenarios stored, histograms comprising icons as described herein may be generated for each output variable, with each separate icon, representative of a corresponding scenario, implemented as a separate Clip. Because the Clips can be made user-selectable, one or more of the icons may likewise be user-selectable such that selection of a given icon causes at least a portion of the input and output values of the corresponding scenario to be displayed.

Figure 2:
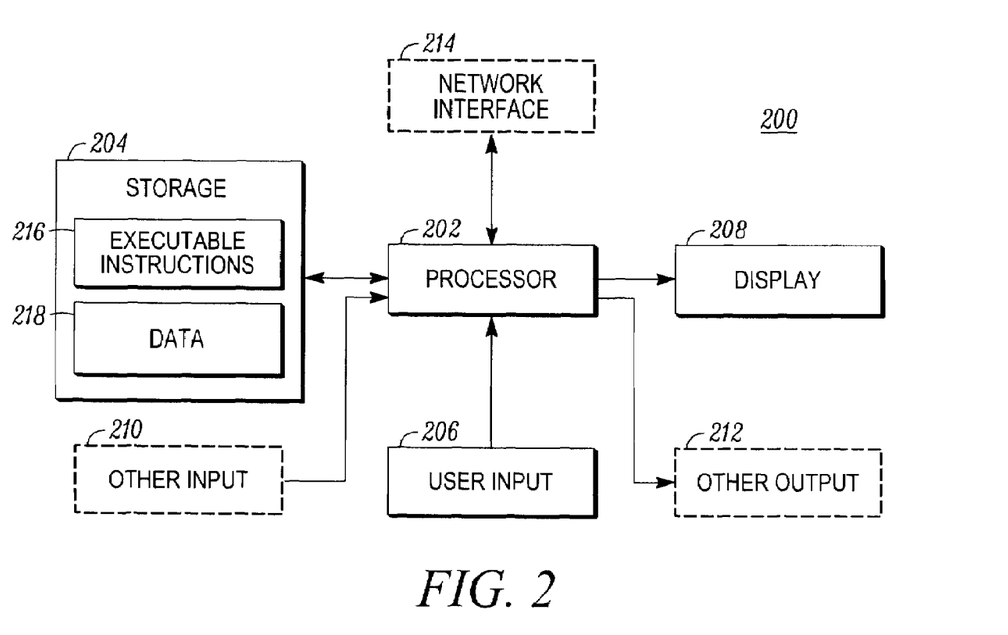
FIG. 2 is a block diagram of an exemplary device that may be used to implement a simulation tool in accordance with the present invention.

Referring now to FIG. 2, an exemplary device 200 that may be used to implement the present invention is further illustrated. In particular, the device 200 comprises a processor 202 coupled to a storage component 204. The storage component 204, in turn, comprises stored executable instructions 216 and data 218. In a preferred embodiment, the processor 202 may comprise one or more processing devices such as a microprocessor, microcontroller, digital signal processor, or combinations thereof capable of executing the stored instructions 216 and operating upon the stored data 218. Likewise, the storage 204 may comprise one or more devices such as volatile or nonvolatile memory including but not limited to random access memory (RAM) or read only memory (ROM). Processor and storage arrangements of the types illustrated in FIG. 2 are well known to those having ordinary skill in the art. In a presently preferred embodiment, the simulation model 102 is stored as a combination of executable instructions and data within the storage component 204, and the Monte Carlo engine 104 is likewise implemented as executable instructions stored within the storage component 204.

In a presently preferred embodiment, the device 200 comprises one or more user input devices 206, a display 208, other input devices 210, other output devices 212 and a network interface 214 all in communication with to the processor 202.

The user input device 206 may comprise any mechanism for providing user input to the processor 202. For example, the user input device 206 may comprise a keyboard, a mouse, a touch screen or any other means whereby a user of the device 200 may provide input data to the processor 202, particularly selection input of various portions of content displayed on the display 208, as described in further detail below. The display 208, may comprise any conventional display mechanism such as a cathode ray tube (CRT), flat panel display, or any other display mechanism known to those having ordinary skill in the art. The other (optional) input devices 210 may include various media drives (such as magnetic disk or optical disk drives) or any other source of input data. Likewise, the other output devices 212 may optionally comprise similar media drive mechanisms as well as other devices capable of providing information to a user of the device 200, such as speakers, LEDs, tactile outputs, etc. Finally, the network interface 214 may comprise hardware and/or software that allows the processor 202 to communicate with other devices via wired or wireless networks, as known in the art.

Figure 3:
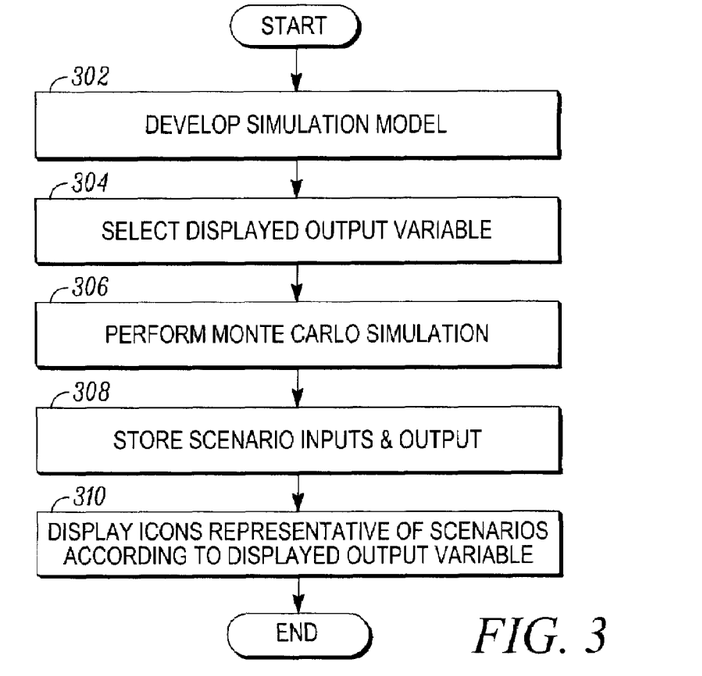
FIG. 3 is a flowchart illustrating simulation processing in accordance with the present invention.

Referring now to FIG. 3, processing in accordance with the present invention is further illustrated. As known to those having ordinary skill in the art, the process illustrated in FIG. 3 may be implemented (with appropriate user inputs where noted) using a processor-equipped device of the type illustrated in FIG. 2, although other processor-equipped devices may be equally employed. Regardless, at block 302, a simulation model is developed as described above. Techniques for developing such models are well known. In particular, for each input variable defined in the simulation model, corresponding probability distribution functions are defined. Typically, definition of each distribution function includes the definition of the value range (i.e., minimum and maximum values) as well as a target value. Often, but not always, the target value can be understood to mean the mean value of the distribution. Separately, minimum, maximum and, preferably, target or nominal values for the output variables are defined at step 302. As described in further detail below, the target or nominal values (for both the inputs and outputs) may be used to determine similarity metrics that allow the scenario icons to be arranged for display or otherwise provided with useful indicia.

As noted above, a simulation model may comprise more than one output variable. Thus, at block 304, a displayed output variable is selected in order to determine which output variable will have its corresponding output value distribution displayed. In a presently preferred embodiment, this is accomplished via selection of an output variable displayed within a variable display region. Thereafter, at block 306, Monte Carlo simulation is performed based on the simulation model developed at block 302. As described above, the Monte Carlo simulation results in a plurality of scenarios, each comprising input and output values that, at block 308, are thereafter stored. Once an acceptable number of scenarios have been generated and stored, processing continues at block 310 where a plurality of icons representative of at least some (preferably all) of the scenarios are displayed according to the displayed output variable selected at block 304. In particular, the processing at block 310 includes generating display data according to the process further illustrated in FIG. 4.

Figure 4:
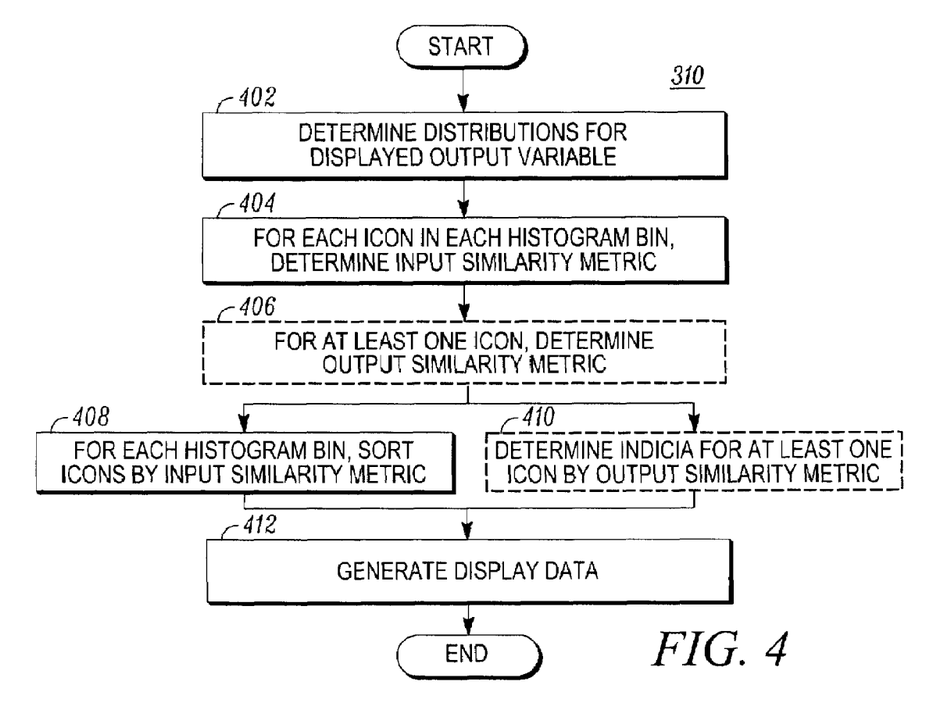
FIG. 4 is a flowchart illustrating display processing for displaying simulation results in accordance with the present invention.

Referring now to FIG. 4, the display operations described above relative to block 310 are described in further detail. Once again, the process illustrated in FIG. 4 may be implemented using a processor-equipped device of the type illustrated in FIG. 2, although other processor-equipped devices may be equally employed. At block 402, distributions for the displayed output variable are determined. In a presently preferred embodiment, this includes dividing the entire range output values for the displayed output variable into a plurality of contiguous histogram bins of equal size spanning the entire range of output values. For example, if the output values for a given displayed output variable range in value from 107 to 875 and a total of eight bins are to be used, each bin could span a 100 value range, i.e., 100-199, 200-299, 300-399, 400-499, 500-599, 600-699, 700-799, 800-899. Once the bins have been determined, the output values are assessed and a tally of the number of output values falling within each bin tabulated. The resulting tallies establish the distribution for the displayed output variable for that set of scenarios.

As a result of the distribution determined at block 402, each scenario of the plurality of scenarios generated by the Monte Carlo simulation will effectively fall within a single histogram bin. When displayed, each scenario is represented by a single icon within a column of icons corresponding to a histogram bin. Preferably, for each icon (or, effectively, scenario) in a given histogram bin, an input similarity metric is determined at block 404 that describes the degree of similarity between the input values for that scenario and the corresponding target or nominal input values designated in the model. For example, assume a model comprises three input variables, designated $I_1$, $I_2$ and $I_3$, and that three corresponding target values, $T_1$, $T_2$ and $T_3$, have been defined. For a given scenario, input values, $V_1$, $V_2$ and $V_3$, for the corresponding input variable are randomly generated. The input similarity metric for that scenario comprises any metric that describes the similarity between the target values, $T_1$, $T_2$ and $T_3$, and the input values, $V_1$, $V_2$ and $V_3$. By way of non-limiting example, if one considers target values, $T_1$, $T_2$ and $T_3$, and the input values, $V_1$, $V_2$ and $V_3$ as vectors, a correlation measurement can be calculated between the target values and the input values describing how similar the vectors are. Other techniques for determining similarity between sequences of values may be equally employed as known by those having ordinary skill in the art.

Thereafter, at block 406, an output similarity metric for at least one icon may be optionally determined. As in the case of block 404, the processing at block 406 generally includes comparing, for at least one output icon, the output value for the displayed output variable and a corresponding nominal output value to determine the similarity between the two. Any of a number of comparison methods may be equally employed. Thereafter, processing continues in parallel at blocks 408 and 410. At block 408, for each histogram bin, the icons therein are sorted by their respective input similarity metrics. In the presently preferred embodiment, the input similarity metrics for those icons within a given histogram bin are sorted in ascending order such that those icons having relatively high similarity metrics (i.e., representative of those scenarios in which the input values relatively closely match the nominal input values) will be displayed closer to the top of the corresponding histogram bin. Likewise, at block 410, an indicia indicative of the output similarity metric for at least one icon is also determined. For example, in a presently preferred embodiment, different colors may be used to indicate whether a given output value is outside the designated range of values for the displayed output variable, within the range or within the range and in substantial proximity to the target value. Thereafter, at block 412, display data in accordance with the sorted icons within each histogram bin, as well as the indicia determined at block 410, generated. Techniques for generating display data (e.g., the graphics commands necessary to present the histogram display and other display elements) are well known in the art. The resulting display data is be used to generate a visual representation on a display screen or similar mechanism, as described above relative to FIG. 2.

The various aspects of the present invention may be best illustrated through use of a specific example, in this case, a model of a call center operation. Tables 1-3 below respectively illustrate exemplary input variables, output variables and the equations defining their relationships.

TABLE 1

| Input Variable | Description |
| --- | --- |
| CSR $/Hour | Hourly pay rate for a Customer Service Representative |
| #CSRs | Number of Customer Service Representatives |
| AHT | Average Handle Time of a call |
| #Calls/Hour | Total number of calls received per hour |
| % Calling CC | Percentage of calls coming to the Call Center |
| % IVR Complete | Percentage of calls handled by an Integrated Voice Response system |
| Training Days | Number of days required to perform training for each Customer Service Representative |

TABLE 2

| Output Variable | Description |
| --- | --- |
| % Calling IVR | Percentage of calls coming to the IVR |
| Retention % | Retention rate of CSRs |
| $Training/CSR | Total cost for training a CSR |
| Salary/Year | Yearly salary cost for all CSRs |
| Annual Training $ | Yearly training cost for all CSRs |
| Total Costs | Total yearly cost for all CSRs |
| Call Capacity/hr. | Hourly call capacity for the call center |
| #Calling CC | Number of calls reaching the call center per hour |
| #Calling IVR | Number of calls reaching the IVR per hour |
| #IVR Handoffs | Number of calls IVR calls that aren't completed by the IVR |
| Total CC Calls/hr. | Total number of calls handled by the call center per hour |
| Cost per call | Cost for each call handled by a CSR |
| Total Salary/hr. | Hourly salary cost for all CSRs |
| +/− call cap./hr. | Number of calls under/over the hourly call capacity of the call center |

TABLE 3

| Output Variable | Relationship |
| --- | --- |
| % Calling IVR | 1 − % Calling CC |
| Retention % | (CSR $/hr.)/Max range value for CSR $/hr. |
| $Training/CSR | Training Days * 8 * CSR $/hr. |
| Salary/Year | Total Salary/hr. * 8 * 365 |
| Annual Training $ | #CSRs * $Training/CSR * (1 − Retention %) |
| Total Costs | Salary/Year + Annual Training |
| Call Capacity/hr. | (#CSRs/AHT) * 60 |
| #Calling CC | #Calls/hr. * % Calling CC |
| #Calling IVR | #Calls/hr. * % Calling IVR |
| #IVR Handoffs | (1 − % IVR Complete) * #Calling IVR |
| Total CC Calls/hr. | #Calling CC + #IVR Handoffs |
| Cost per call | (CSR $/hr./3600) * AHT |
| Total Salary/hr. | CSR $/hr. * #CSRs |
| +/− call cap./hr. | Call Capacity/hr. − Total CC Calls/hr. |

Note that the exemplary model set forth in Tables 1-3 is for illustration purposes only. With this model in mind, further understanding of the present invention may be gained through reference to FIGS. 5-10.

Figure 5:
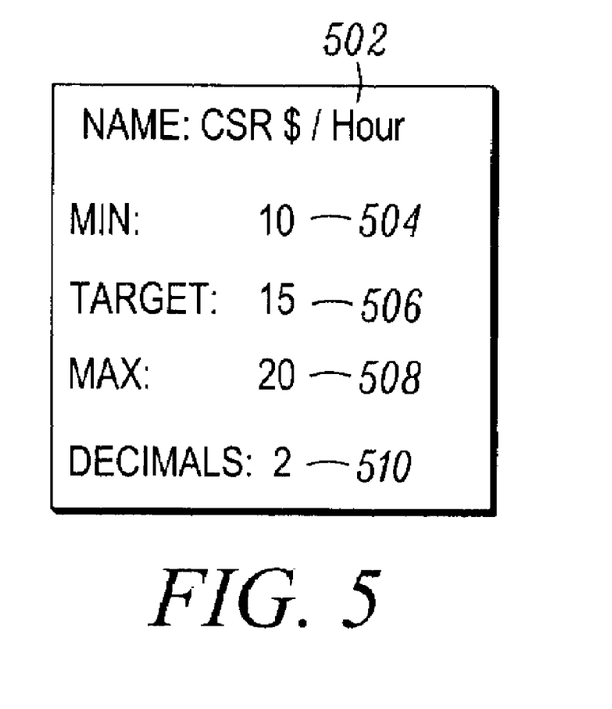
FIGS. 5 and 6 illustrate exemplary variable range definition regions that may be displayed to a user of a simulation tool in accordance with the present invention.
Figure 6:
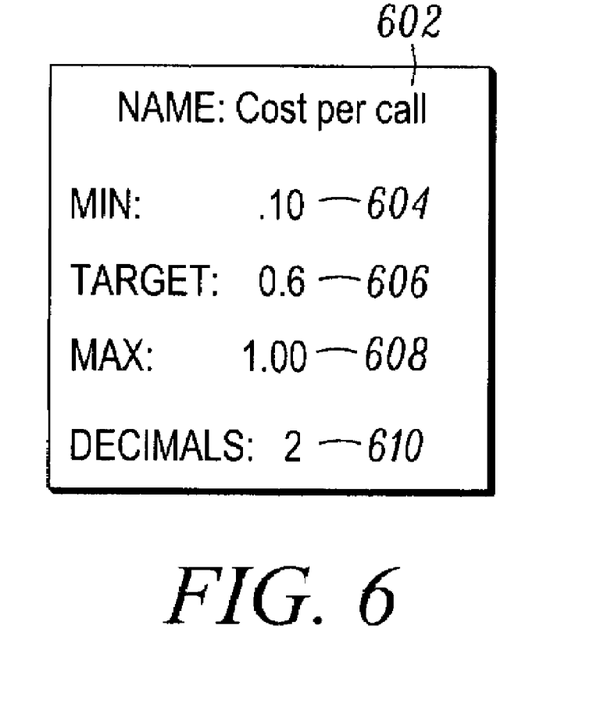

Referring now to FIGS. 5 and 6, variable range definition regions in accordance with the present invention are further illustrated. FIGS. 5 and 6 are examples of a portion of a display screen used for the input of variable ranges for the various input variables of a given simulation model. With reference now to FIG. 5, a variable name field 502 is provided that allows a user to enter alphanumeric text that is used to uniquely identify a given input variable, in this case the input variable "CSR $/hr." Additionally, range fields 504, 508 are provided to define minimum and maximum values thereby defining an input variable range. In the example shown, a value of 10 is provided for the minimum variable value, whereas a value of 20 is provided as the variable maximum value. Furthermore, a target or nominal value field 506 is provided, which in the example shown has a value of 15. In accordance with the implementation described above, the effect of these range and target values is to define an assumed triangular distribution for use during the simulation. However, in other implementations, it would be desirable, using known techniques, to provide an input mechanism (such as a drop-down menu or the like) that allows a user to select a specific type of distribution and enter defining values into corresponding input fields according to the selected distribution function. Further still, a decimal display field 510 is provided which allows the user to specify the number of decimal places to be provided when displaying this particular input variable. In a similar vein, and with reference to FIG. 6, output variables may likewise be defined. That is, for each output variable, a variable name field 602 is provided to allow the entry of alphanumeric text for the output variable, in this case the output variable "Cost per call." Likewise, range fields 604, 608 are provided as is a nominal value field 606. Finally, a decimal display input field 610 is provided to specify the display format of the output variable.

Figure 7:
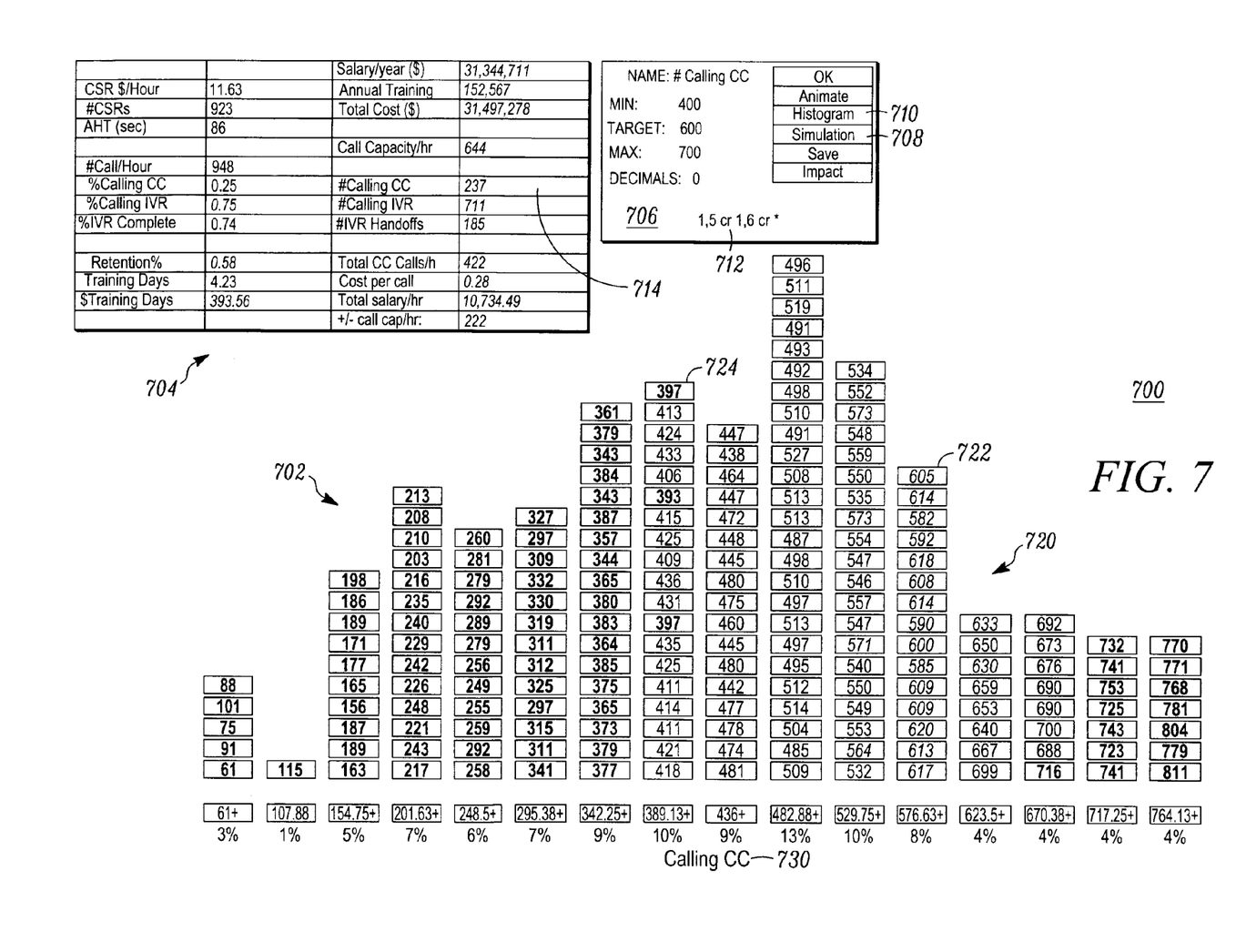
Figure 8:
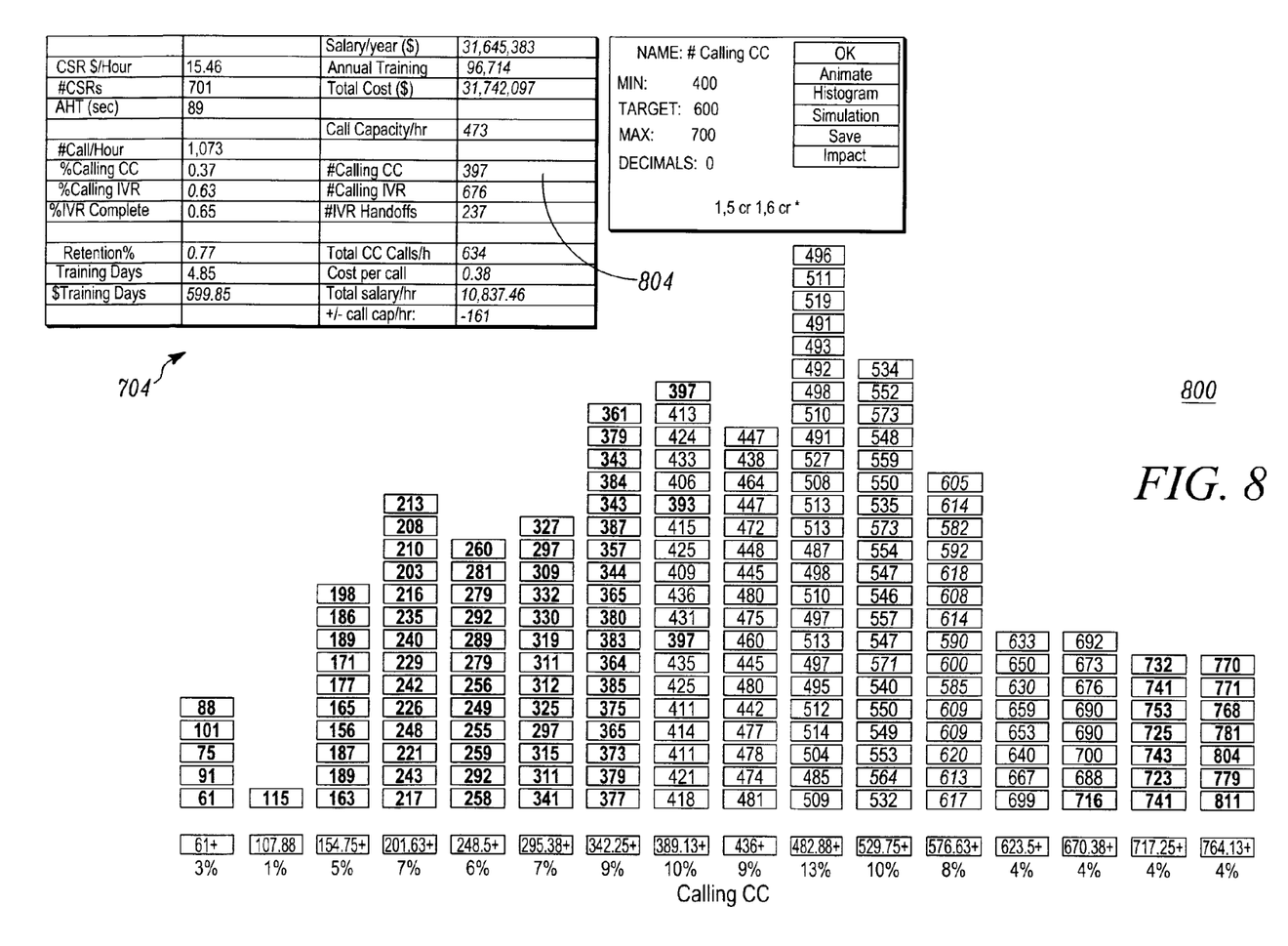

FIGS. 7 through 10 illustrate exemplary displays in accordance with the present invention. Referring now to FIG. 7, the display 700 comprises a histogram display region 702, a variable display region 704, and a variable range definition region 706. As shown, the histogram display region 702 comprises a plurality of icons 720 arranged in columns, which columns correspond to a number of histogram bins. In the example shown, two hundred separate icons 702 are distributed among sixteen separate histogram bins. As described above, each icon 720 is representative of a single input/output scenario generated by the Monte Carlo engine. Further note that each icon preferably includes an indicator of the corresponding output value for the underlying scenario.

The variable display region 704 displays all of the possible input and output variables for the given simulation model, while displaying the specific input and output values for any given scenario. For example, in the example shown, input variables are illustrated in normal typeface, whereas output variables are illustrated in italicized typeface. For any given display 700, a single displayed output variable may be selected. To this end, a user of the display 700 may use a user input device, such as a mouse or similar mechanism, to select one of the output variables, in this case the "#Calling CC" variable 714. Note that selection of the displayed output variable 714 causes the variable range definition region 706 to display not only the given name of the output variable, but also the range and desired target values previously assigned to that output variable during development of the simulation model. In one aspect of the present invention, an equation entry field 712 is provided that allows for the direct editing of the underlying mathematical definition of the displayed output variable. As further shown, the variable range definition region 706 in the example shown also comprises a number of buttons used to control operation of the simulation tool. In particular, a simulation button 708 is provided that, upon selection by a user, causes the Monte Carlo engine to execute a full set of scenarios as described above. Thereafter, selection of the histogram button 710 causes the histogram region 702 to display the plurality of icons 720 illustrating distribution of the displayed output variable 714. Note that the histogram region 702 preferably includes an identification data field 730, setting forth the textual description of the particular displayed output variable.

As previously described, each icon's position within its respective column is indicative of the degree of similarity of that icon's corresponding input values to the nominal input values. Furthermore, in the examples illustrated in FIGS. 7-10, the similarity of each scenario's output value for the displayed output variable is illustrated by the typeface of the output value shown in the corresponding icon. For example, in the illustration of FIG. 7, output values that are within the defined range for the displayed output variable are illustrated in normal typeface. Those output values that are not only within the defined range, but are also within, for example, a predetermined percentage of the nominal value for the displayed output variable are illustrated in italic type, whereas output values falling outside the defined range are illustrated in bold typeface. For example, a first icon 722 is shown having an output value of 605 and the italicized font of the displayed output value indicates that the output value 605 is within a predetermined range of the nominal output value (in this case, 600). Because the first icon 722 is displayed at the top of its corresponding column, even a cursory review of the display 700 allows one to readily determine that the input values for the scenario underlying the first icon 722 are reasonably similar to the nominal input values defined for the simulation model.

In contrast, in the case of a second icon 724 corresponding to a scenario in which the output value is 397, the bold typeface is used to indicate that the output value is below the minimum range defined for the displayed output variable. Once again, note that the second icon 724 is displayed at the top of its corresponding column, indicating a relatively high degree is similarity between the input values for that scenario and the nominal input values. The second icon 724 therefore represents a scenario that would likely be of particular interest to the model developer or analyst in that, although expected input values have most likely been used, the resulting output value is nevertheless out of range. This may indicate a flaw in the simulation model or in the assumptions used in creating it.

In the presently preferred embodiment, each of the icons 720 displayed in the histogram display region 702 may be selected by a user of the display 700 thereby causing the variable display region 704 to be updated to show the input and output values for the selected icon and its underlying scenario. For example, with reference now to FIG. 8, the variable display region 704 is shown after selection of the second icon 724. Note that the output value 804 associated with the displayed output variable 714 now reflects the output value of the scenario associated with the second icon 724, i.e., a value of 397. Likewise, the other input and output values are also updated in accordance with the selected scenario. Again, the displayed output value 804 is shown in bold typeface indicating that the output value for this scenario and for the displayed output variable is outside of the predetermined range.

Figure 10:
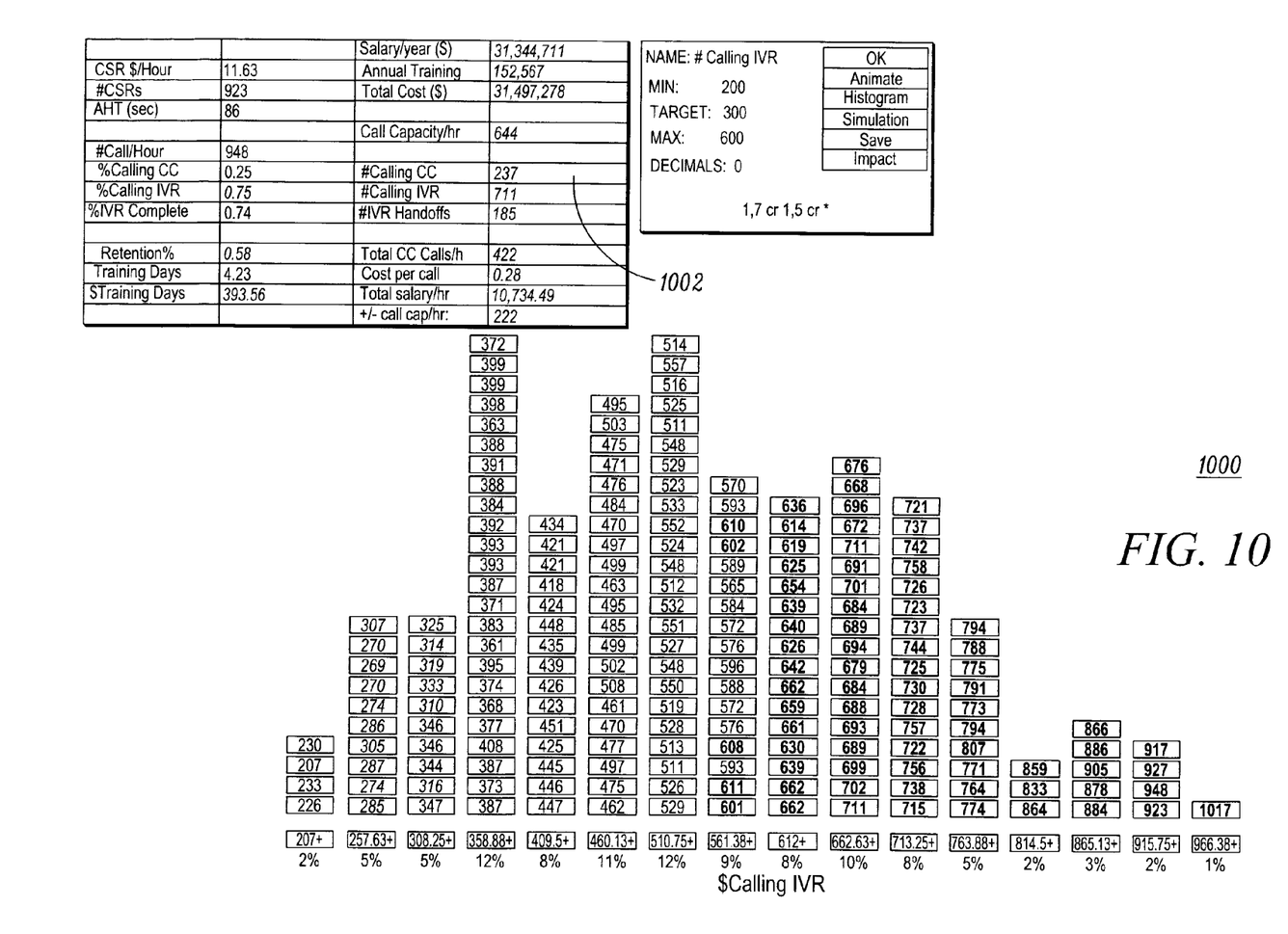

Conversely, selection of the first icon 722 results in the display 900 illustrated in FIG. 9. In this instance, note that the displayed value 904 is illustrated in italic font indicating that the output value for this scenario and for the displayed output variable is substantially close to the target output value. Note that any of the output variables illustrated in the variable display region 704 may be selected to be the displayed output variable, thus controlling what is displayed in the histogram display region 702. For example, as illustrated in FIG. 10, a different histogram display 1000 results upon selection of the second displayed output variable 1002 (in this case, the "#Calling IVR" output variable) causing the histogram display regional 702 to be updated with new histogram data.

While the particular preferred embodiments of the present invention have been shown and described, it will be obvious to those skilled in the art that changes and modifications may be made without departing from the teachings of the invention. For example, an environment other than Macromedia Flash (in conjunction with a spreadsheet program) may be used to implement the present invention, as known to those of skill in the art. It is therefore contemplated that the present invention cover any and all modifications, variations or equivalents that fall within the spirit and scope of the basic underlying principles disclosed above and claimed herein.

What is claimed is:

1. A method for displaying simulation results, the method comprising:
   performing a Monte Carlo simulation based on a simulation model comprising a plurality of input variables and at least one output variable, the Monte Carlo simulation comprising a plurality of scenarios, each of the plurality of scenarios comprising a plurality of input values for the plurality of input variables and a plurality of output values for the at least one output variable;
   storing, for each scenario of the plurality of scenarios, the plurality of input values and the plurality of output values;
   displaying a plurality of icons, uniquely corresponding to and representative of the plurality of scenarios, according to a displayed output variable of the at least one output variable, the plurality of icons arranged as a histogram comprising a plurality of columns corresponding to histogram bins for the displayed output variable, each column of the plurality of columns comprising a corresponding portion of the plurality of icons; and
   for each column of the plurality of columns and for each icon of the corresponding portion of the plurality of icons, determining similarity between the plurality of input values associated with the icon and a plurality of nominal input values uniquely corresponding to the plurality of input variables to provide an input similarity metric,
   wherein those icons of the corresponding portion of the plurality of icons having increasingly higher input similarity metrics are displayed at increasingly higher locations within each column of the plurality of columns.

2. The method of claim 1, wherein displaying the plurality of icons further comprises displaying, for at least one icon of the plurality of icons, indicia of at least one output value of the plurality of output values uniquely corresponding to the at least one icon.

3. The method of claim 1, further comprising:
   for at least one icon of the plurality of icons, determining similarity between at least one output value of the plurality of output values uniquely corresponding to the at least one icon and a nominal output value uniquely associated with the displayed output variable to provide at least one output similarity metric,
   wherein displaying the plurality of icons further comprises displaying, for each of the at least one icon, indicia indicative of corresponding ones of the at least one output similarity metric.

4. The method of claim 3, wherein displaying the indicia further comprises displaying a color associated with each icon of the at least one icon.

5. The method of claim 1, further comprising:
receiving selection information corresponding to a selected icon of the plurality of icons, the selected icon being representative of a selected scenario of the plurality of scenarios; and
displaying, responsive to the selection information, input values of the plurality of input values and output values of the plurality of output values corresponding to the selected scenario.

6. A method for displaying results from a Monte Carlo simulation based on a simulation model comprising a plurality of input variables and at least one output variable, the Monte Carlo simulation comprising a plurality of scenarios, each of the plurality of scenarios comprising a plurality of input values for the plurality of input variables and a plurality of output values for the at least one output variable, the method comprising:
receiving selection information concerning an output variable of the at least one output variable to be displayed to provide a displayed output variable;
displaying a plurality of icons uniquely corresponding to and representative of the plurality of scenarios according to output values of the displayed output variable, the plurality of icons arranged as a histogram comprising a plurality of columns corresponding to histogram bins for the displayed output variable, each column of the plurality of columns comprising a corresponding portion of the plurality of icons, wherein, for each column of the plurality of columns and for each icon of the corresponding portion of the plurality of icons, similarity between the plurality of input values associated with the icon and a plurality of nominal input values uniquely corresponding to the plurality of input variables is determined to provide an input similarity metric, wherein those icons of the corresponding portion of the plurality of icons having increasingly higher input similarity metrics are displayed at increasingly higher locations within each column of the plurality of columns;
receiving selection information corresponding to one of the plurality of icons to provide selected icon information; and
displaying input and output variables for a selected scenario of the plurality of scenarios based on the selected icon information.

7. The method of claim 6, wherein displaying the plurality of icons further comprises displaying, for at least one icon of the plurality of icons, indicia of at least one output value of the plurality of output values uniquely corresponding to the at least one icon.

8. The method of claim 6, further comprising:
for at least one icon of the plurality of icons, determining similarity between at least one output value of the plurality of output values uniquely corresponding to the at least one icon and a nominal output value uniquely associated with the displayed output variable to provide at least one output similarity metric,
wherein displaying the plurality of icons further comprises displaying, for each of the at least one icon, indicia indicative of corresponding ones of the at least one output similarity metric.

9. The method of claim 8, wherein displaying the indicia further comprises displaying a color associated with each icon of the at least one icon.

10. A computer-readable medium having stored thereon executable instructions that, when executed by a processor, cause the processor to:

perform a Monte Carlo simulation based on a simulation model comprising a plurality of input variables and at least one output variable, the Monte Carlo simulation comprising a plurality of scenarios, each of the plurality of scenarios comprising a plurality of input values for the plurality of input variables and a plurality of output values for the at least one output variable;
store, for each scenario of the plurality of scenarios, the plurality of input values and the plurality of output values;
generate display data for a plurality of icons, uniquely corresponding to and representative of the plurality of scenarios, according to a displayed output variable of the at least one output variable, the display data arranged as a histogram comprising a plurality of columns corresponding to histogram bins for the displayed output variable, each column of the plurality of columns comprising a corresponding portion of the plurality of icons; and
for each column of the plurality of columns and for each icon of the corresponding portion of the plurality of icons, determine similarity between the plurality of input values associated with the icon and a plurality of nominal input values uniquely corresponding to the plurality of input variables to provide an input similarity metric,
wherein those icons of the corresponding portion of the plurality of icons having increasingly higher input similarity metrics will be displayed at increasingly higher locations within each column of the plurality of columns.

11. An apparatus comprising:
a processor;
a display coupled to the processor; and
a computer-readable medium having stored thereon executable instructions that, when executed by the processor, cause the processor to:
perform a Monte Carlo simulation based on a simulation model comprising a plurality of input variables and at least one output variable, the Monte Carlo simulation comprising a plurality of scenarios, each of the plurality of scenarios comprising a plurality of input values for the plurality of input variables and a plurality of output values for the at least one output variable;
store, for each scenario of the plurality of scenarios, the plurality of input values and the plurality of output values;
generate display data, for being displayed on the display, for a plurality of icons, uniquely corresponding to and representative of the plurality of scenarios, according to a displayed output variable of the at least one output variable, the display data arranged as a histogram comprising a plurality of columns corresponding to histogram bins for the displayed output variable, each column of the plurality of columns comprising a corresponding portion of the plurality of icons; and
for each column of the plurality of columns and for each icon of the corresponding portion of the plurality of icons, determine similarity between the plurality of input values associated with the icon and a plurality of nominal input values uniquely corresponding to the plurality of input variables to provide an input similarity metric, wherein those icons of the corresponding portion of the plurality of icons having increasingly higher input similarity metrics will be displayed at increasingly higher locations within each column of the plurality of columns.

12. The apparatus of claim 11, further comprising:
a user input device operative to provide selection information corresponding to an icon of the plurality of icons.

13. The apparatus of claim 11, wherein the display further comprises:
a histogram display region, rendered on the display, comprising the plurality of icons.

14. The apparatus of claim 13, wherein the histogram display regions comprises an indication of the displayed output variable.

15. The apparatus of claim 11, further comprising:
a variable display region, rendered on the display, for displaying at least one of the plurality of input variables and at least one of the at least one output variable, as well as corresponding input values and corresponding output values.

16. The apparatus of claim 15, further comprising:
a variable range definition region, rendered on the display, for displaying at least one of a range minimum data entry field, a range maximum data entry field and a target data entry field corresponding to a selected variable chosen from either the at least one of the plurality of input variables or the at least one of the at least one output variable.

* * * * *